United States Patent [19]

Parrott

[11] 4,168,780
[45] Sep. 25, 1979

[54] FLOW RAIL RACK

[75] Inventor: Robert C. Parrott, Greenville, S.C.

[73] Assignee: Engineered Products, Greenville, S.C.

[21] Appl. No.: 887,045

[22] Filed: Mar. 16, 1978

[51] Int. Cl.² .............................................. A47F 5/00
[52] U.S. Cl. .................................. 211/151; 193/35 R
[58] Field of Search ............... 211/151, 182, 134, 183, 211/186, 49 D, 153; 193/35 R, 35 A

[56] References Cited

U.S. PATENT DOCUMENTS

| 1,563,116 | 11/1925 | Tinsley | 211/151 |
| 1,711,329 | 4/1929 | Short | 211/49 D |
| 2,964,154 | 12/1960 | Erickson | 193/35 R |
| 2,982,387 | 5/1961 | Hinckley | 193/35 R |
| 3,785,502 | 1/1974 | Konstant | 211/134 |
| 3,894,634 | 7/1975 | Gotham et al. | 211/186 X |
| 3,900,112 | 8/1975 | Azzi et al. | 211/151 X |
| 4,056,195 | 11/1977 | Keith | 211/153 |

FOREIGN PATENT DOCUMENTS 447524   3/1968   Switzerland .............................. 211/151

*Primary Examiner*—Roy D. Frazier
*Assistant Examiner*—Robert W. Gibson, Jr.
*Attorney, Agent, or Firm*—Bailey, Dority & Flint

[57] ABSTRACT

A storage rack structure is disclosed of the gravity feed type having inclined storage racks carried between front and rear vertical standards on which a pallet carrying cases and the like is loaded from the rear for gravity feed to the front wherein the flow rails are hung within a channel of a front facing rail having a back web providing an abutment for stopping the pallet and include a raised abutment at the rear end thereof providing a fulcrum about which the pallet initially impacts and pivots for loading onto the flow rail.

5 Claims, 7 Drawing Figures

U.S. Patent  Sep. 25, 1979  Sheet 2 of 2  4,168,780
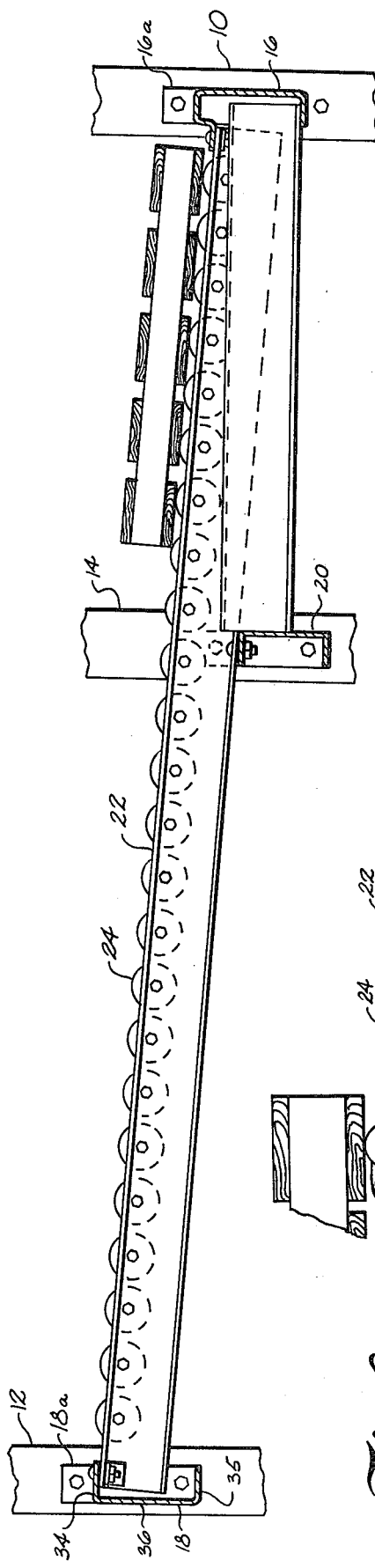
Fig. 3
Fig. 3a
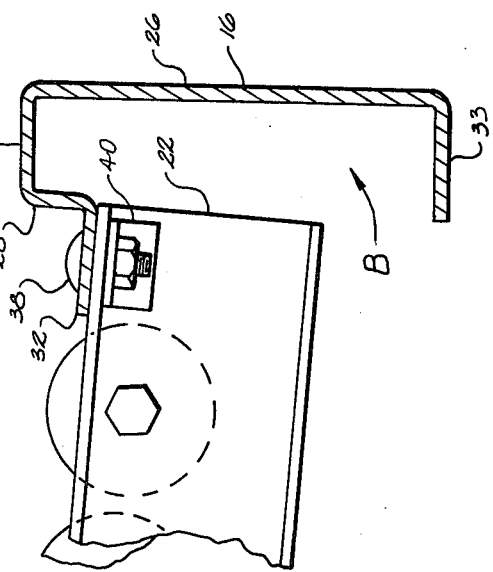
Fig. 6
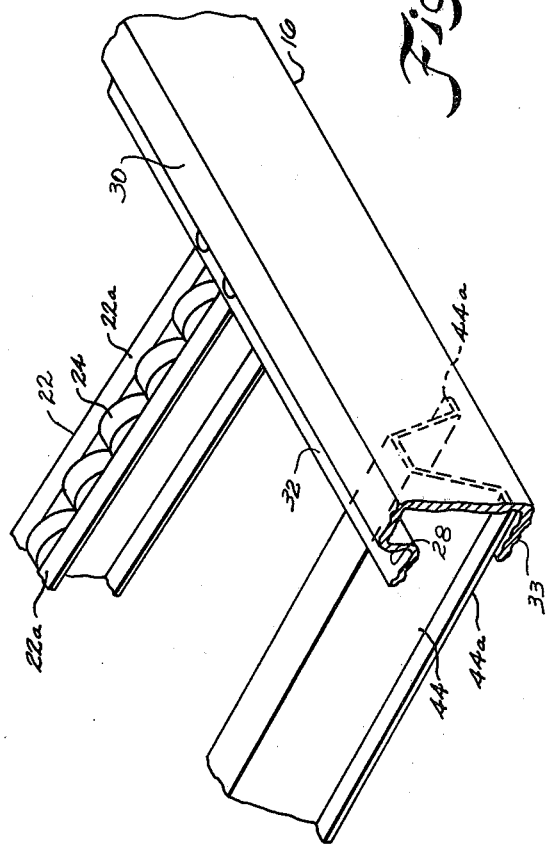
Fig. 4

FLOW RAIL RACK

BACKGROUND OF THE INVENTION

Modern warehousing operations typically include storage of cased articles carried on pallets in an orderly fashion upon rack structures rather than stacking one atop another on individual pallets on the floor. Gravity storage systems are popularly utilized in warehouse operations wherein pallets of articles are loaded from the rear of the storage rack and are fed by gravity to the front end of the storage rack whereupon operators may remove the articles and pallets causing the next adjacent pallet to come to the front. Examples of these type storage systems are disclosed in U.S. Pat. Nos. 3,900,112 and 3,785,502. In the prior systems, damage to the exposed ends of the flow rails by forklift operations and personal injury due to the sharp exposed edges of the flow rail are problems to which considerable attention need be given. Attempts to cover the edges of the front ends of the flow rails have resulted in creation of sharp edges on which a pallet may be easily hung when moved during removal.

Accordingly, an important object of the present invention is to provide an improved storage rack structure being of high structural integrity which minimizes damage to and injury from the flow rails.

Another important object of the present invention is to provide a storage rack structure which reduces the amount of height lost between vertically spaced flow rail racks due to structural mounting.

Another important object of the present invention is to provide an improved storage rack structure in which the rollers of the flow rails are protected both during the loading and unloading of pallets of articles.

SUMMARY OF THE INVENTION

The invention relates to storage rack structure of the type having laterally spaced front vertical standards, laterally spaced rear vertical standards longitudinally spaced from the front standards, a horizontal front facing rail member extending between the front standards, and a horizontal rear rail member extending between the rear standards. Flow rail means extend between the front and rear rail members defining storage racks upon which pallets are moved for loading and storage thereon. It has been found that improved structure can be provided by a front facing rail member which includes a channel having a front facing web, a shortened back web spaced from the facing web, a bridging flange integrally connecting the facing and back webs, and a top flange integral with a lower portion of the back web extending rearwardly therefrom. The flow rail means includes a plurality of spaced flow rails having a plurality of rollers carried thereon with each flow rail having a front end portion received within the channel of the front rail adjacently underlying the top flange of the channel and being hung therefrom.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a sectional view taken along line 3—3 of FIG. 2;

FIG. 3a is an enlarged elevation of the rear end portion of the flow rail and rack structure of FIG. 3;

FIG. 4 is an enlarged perspective view of the front end portion and front rail structure according to the invention;

FIG. 6 is an enlarged side elevation illustrating the detail of a front channel rail member and flow rail mounting structure according to the invention.

DESCRIPTION OF A PREFERRED EMBODIMENT

Figure 1:
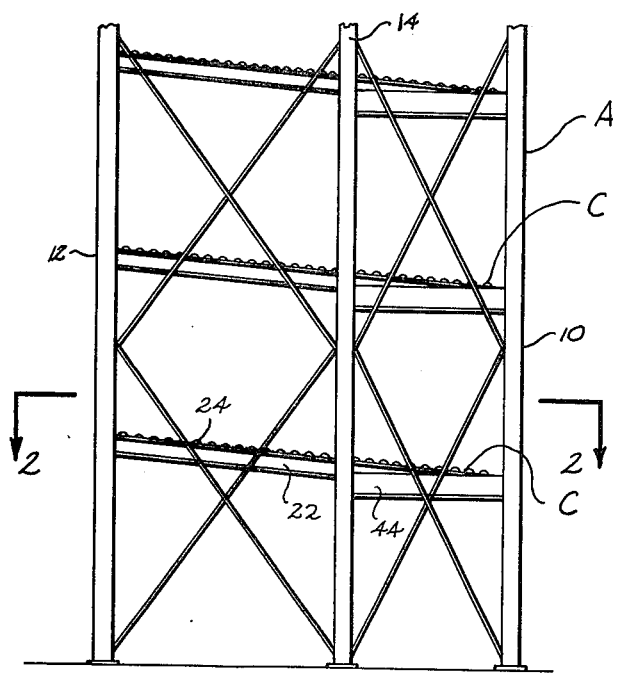
FIG. 1 is a side elevation illustrating a storage rack structure having three vertically spaced storage bays constructed according to the invention.
Figure 5:
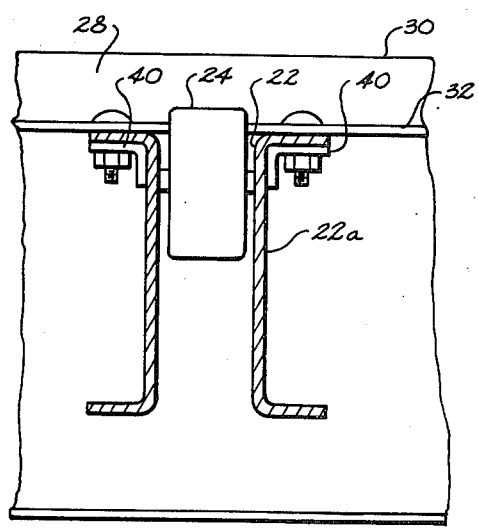
FIG. 5 is a section taken along line 5—5 of FIG. 2.

The drawings illustrate a storage rack structure A having laterally spaced front vertical standards 10 and laterally spaced rear vertical standards 12 longitudinally spaced from the front standards 10. Intermediate vertical standards 14 are included between the front and rear standards. A horizontal front facing rail member 16 extends between adjacent front standards 10 and a horizontal rear rail member 18 extends between adjacent rear standards 12. Facing rail 16 and rear rail 18 may be attached to the front and rear vertical standards in any suitable manner such as by mounting plates 16a and 18a, respectively, which may be welded or bolted to the standards. Intermediate rail 20 is carried between intermediate vertical standards 14 in a like manner.

A means is provided for establishing a flow rail over which the pallets move from the front to the rear of the storage rack structure by spaced flow rails 22 having a plurality of rollers 24 carried along the length thereof. As illustrated, the flow rails include a pair of C-shaped channel members 22a having a web portion opposing each other with rollers 24 carried therebetween in any suitable manner on spindles.

Front facing rail member 16 includes an open channel B defined by a front facing web 26 and a shortened back web 28. A bridging flange 30 integrally connects the front web 26 and back web 28. A top flange 32 extends rearwardly from a lower portion of the back web 28 and is integral therewith. A bottom flange 33 completes the channel structure of the front rail 16 as being integral with the lower edge of web 26 and extending rearwardly therefrom. Rear rail 18 is illustrated in the form of a C channel member having a top flange 34, a bottom flange 35, and a web portion 36. Similarly, intermediate rail 20 comprises a C-shaped channel member.

Referring now in more detail to the FIG. 6, it will be seen that the flow rail 22 has a front end portion which is received within the channel B of the front rail 16 and that it adjacently underlies the rearwardly extending top flange 32 and is attached thereby by any suitable means such as by carriage bolts 36. In this manner, the flow rail is hung or suspended from the top flange which is an expedient in affording proper clearance between the pallets carried thereon and the next vertically spaced flow rail rack and in conserving vertical space. It will be noted that the flow rail 22 is attached to the top flange 32 by utilizing a bent washer 40 which corresponds to the shape of the top flange and web portion of the channel member 22a reducing the tendency of the flange to bend under loads. The rear end of the flow rail 22 is hung from the top flange 34 of rail 18.

Figure 2:
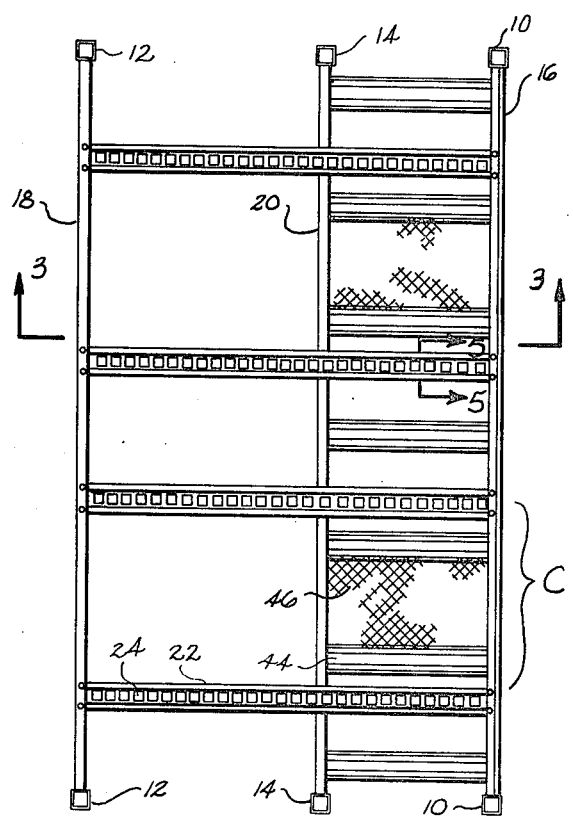
FIG. 2 is a top plan view illustrating a storage rack structure according to the invention.

As best seen in FIG. 2, a pair of next adjacent flow rails 22 together with front and back rails 16 and 18 define an inclined storage platform rack or bay C and that two such racks are provided between a pair of adjacent standards.

Of particular importance is the fact that the back web 28 provides an abutment for stopping the pallet full of articles as it reaches the front end of the storage rack. In addition, it will be noted that a raised abutment means is provided by the head of a carriage bolt 42 which is utilized to attach the rear end of each flow rail 22 to the top flange 34 of the rail 18. This raised abutment provides a fulcrum over which the bottom of the pallet pivots when being loaded onto the flow rail so as to initially impact a plurality of rollers 24 simultaneously which avoids damage to the rollers as often occurs when an edge of the pallet repeatedly strikes the first roller on the rail when being loaded. Such action eventually breaks a roller or renders it inoperative by jamming.

It has been found according to the invention that the front facing rail member not only affords protection to ends of the flow rails 22 from damage by a fork lift and the like during unloading, but also affords protection against accidental personal injury from the sharp edges of the ends. Furthermore, hanging the flow rail 22 from the top flange 32 within the channel B reduces the overall height required to mount the flow rails in a structure wherein vertically spaced storage racks are utilized. The bridging flange 30 of generally flat and smooth construction presents no irregular edges which minimizes the hanging of the pallet on the front rail when removed.

It will be noted that a plurality of spaced hat section rail members 44 are carried longitudinally extending between the front rail 16 and the intermediate rail 20. Each hat rail includes a pair of outwardly extending flanges 44a which are utilized to supportably carry a wire mesh floor member 46 therebetween which prevents articles from falling to the floor and provides safety in affording a floor for an operator in the absence of a pallet. Each hat section rail 44 rests on bottom flange 33 of front rail 16 and may be attached in any suitable manner such as by welding. It will be noted that each hat section rail extends vertically between the top flange 32 and bottom flange 33 enhancing the structural integrity of front rail 16 under load.

Thus it can be seen that an improved storage rack structure can be had according to the invention wherein ends of the flow rails are protected from damage, and the possibility of personal injury is reduced. The unique manner of suspending the flow rail provides optimum utilization of vertical space and the unique construction of the front rail channel affords a highly advantageous abutment for stopping the pallet as well as for moving the pallet thereover.

While a preferred embodiment of the invention has been described using specific terms, such description is for illustrative purposes only, and it is to be understood that changes and variations may be made without departing from the spirit or scope of the following claims.

What is claimed is:

1. In a storage rack structure of the type having laterally spaced front vertical standards, laterally spaced rear vertical standards longitudinally spaced from said front standards, a horizontal front facing rail member extending between said front standards, a horizontal rear rail member extending between said rear standards, and flow rail means extending between said front and rear rail members over which a pallet of articles move for loading on said storage rack structure, the improvement comprising:

said front facing rail member including a channel having a front facing web, a shortened back web spaced from said facing web, a bridging flange integrally connecting an upper portion of said facing and back webs, and a rearwardly extending flange integral with a lower portion of said back web;

said flow rail means including a plurality of spaced flow rails having a plurality of rollers, each said flow rail having a front end portion received within said channel of said front facing rail member adjacently underlying said rearwardly extending flange; and means for attaching each said flow rail to said front facing rail member flush against the underneath of said rearwardly extending flange in a suspended configuration.

2. The structure of claim 1 including raised abutment means disposed adjacent the rear end of each said flow rail extending above said rollers providing a fulcrum over which said pallet of articles may pivot to initially impact on a plurality of said rollers simultaneously.

3. The structure of claim 1 wherein said channel of said front facing rail includes a rearwardly extending flange integral with a lower portion of said front facing web.

4. The structure of claim 1 wherein said back web of said front facing rail defines an abutment for stopping the forward movement of a pallet carrying articles for storage on said rack structure.

5. In a storage rack structure of the type having laterally spaced front vertical standards, laterally spaced rear vertical standards longitudinally spaced from said front standards, a horizontal front facing rail member extending between said front standards, a horizontal rear rail member extending between said rear standards, and flow rail means extending between said front and rear rail members over which a pallet of articles move for loading on said storage rack structure, the improvement comprising:

said front facing rail member including a channel having a front facing web, a shortened back web spaced from said facing web, a bridging flange integrally connecting an upper portion of said facing and back webs, and a rearwardly extending flange integral with a lower portion of said back web;

said flow rail means including a plurality of spaced flow rails having a plurality of rollers, each said flow rail having a front end portion received within said channel of said front facing rail member adjacently underlying said rearwardly extending flange;

means for attaching said flow rails to said front facing rail member; and a pair of spaced hat section rails carried intermediate a pair of next adjacent flow rails having outwardly extending flanges supportably carrying a wire mesh floor therebetween.

* * * * *